Patented Jan. 26, 1954

2,667,494

UNITED STATES PATENT OFFICE 2,667,494

THIOPHENE DERIVATIVES

William S. Emerson and Tracy M. Patrick, Jr., Dayton, Ohio, assignors to Monsanto Chemical Company, St. Louis, Mo., a corporation of Delaware No Drawing. Application August 5, 1948, Serial No. 42,735

8 Claims. (Cl. 260—329)

This invention relates to a family of new chemical compounds derived from thiophene which have unusual value as accelerators for rubber compositions.

The primary purpose of this invention is to develop new products from thiophene. Another purpose is to prepare new and useful rubber chemicals.

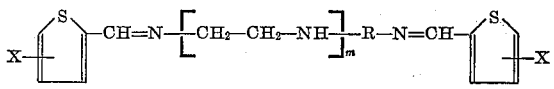

wherein X is a radical of the group consisting of hydrogen, alkyl, and halogen, $m$ is a small whole number from zero (0) to three (3) and R is a divalent alkylene radical having from two to six carbon atoms and having the said two valence bonds attached to different carbon atoms. The X substituent may be any halogen, chlorine, bromine, fluorine and iodine, although chlorine and bromine are most useful, and any alkyl radical, although those having from one to four carbon atoms, methyl, ethyl, isopropyl, n-propyl, n-butyl, isobutyl and t-butyl are of greatest importance.

The new compounds are made by reacting a suitable thiophenealdehyde and a polyamine, such as ethylene diamine, 1,3-propylene diamine, tetramethylene diamine, 1,2-propylene diamine, 1,3-butylene diamine, diethylenetriamine, triethylenetetramine, hexamethylenediamine, pentamethylenediamine, and tetraethylenepentamine. The reactions are preferably conducted by mixing the reagents in the presence of a suitable solvent and heating to effect a chemical combination. Suitable solvents are benzene, xylene, chlorobenzene, tetralin, decalin and toluene. The reactions may be conducted at reflux temperature and the evolved water removed from the condensed vapors before returning them to the reaction vessel. When the reaction is substantially complete, the product may be separated from the reaction mass by cooling, by evaporation of solvent, or by the addition of a nonsolvent. The purification may be made by recrystallization from a solvent-nonsolvent mixture, for example a mixture of benzene and hexane.

The new compounds have particular utility as vulcanization accelerators for natural and synthetic rubber compositions.

Further details are set forth with respect to the following example.

Example

A reaction flask was charged with 33.6 grams of 2-thiophenealdehyde, 13.1 grams of 69 percent ethylenediamine and 100 cc. of benzene. The flask was provided with a reflux column packed with glass helices and surmounted by a Dean and Stark trap. The reaction mass was refluxed for 30 minutes during which time 9.5 cc. of water was collected, this representing the theoretical amount of water evolved by the reaction. The distillation was then conducted until 60 cc. of benzene was removed. The residual solution was cooled and the reaction mass, which contained a large proportion of crystalline material was diluted with 200 cc. of hexane. The crystalline precipitate was then separated by filtration, washed with hexane and dried over potassium hydroxide in a vacuum desiccator. After recrystallizing it twice from a benzene-hexane mixture, a crystalline material having a melting point of 90–91° C. was obtained and identified as bis-(2-thenal) ethylenediamine.

The invention is defined by the following claims.

1. A chemical compound having the structure:

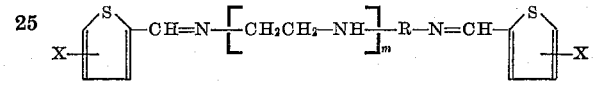

wherein X is a radical of the group consisting of hydrogen, alkyl and halogen, $m$ is a small whole number from zero (0) to three (3), and R is a divalent alkylene radical having from two to six carbon atoms and the said two valence bonds attached to different carbon atoms.

2. A chemical compound having the structure:

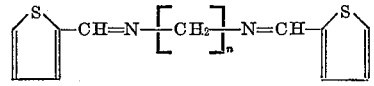

wherein $n$ is a small whole number from two to six, inclusive.

3. Bis-(2-thenal) ethylenediamine.
4. Bis-(5-chloro-2-thenal) ethylenediamine.
5. Bis-(5-methyl-2-thenal) ethylenediamine.
6. A method of preparing a bis-(2-thenal) alkylenepolyamine which comprises mixing a thiophenealdehyde having the structure:

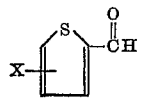

wherein X is a radical of the group consisting of halogen, alkyl and hydrogen, with an amine having the structure:

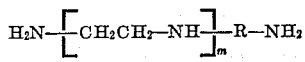

wherein $m$ is a small whole number from zero (0) to three (3), and R is a divalent alkylene radical having from two to six carbon atoms in the presence of a solvent, and the said two valence bonds attached to different carbon atoms.

7. A method of preparing a bis-(thenal) alkylenediamine which comprises mixing thiophenealdehyde and a diamine having the structure:

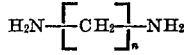

wherein $n$ is a small whole number from two to six, heating the mixture in the presence of a solvent for the reactants at reflux temperature to evolve water, and recovering the resultant compound by crystallization.

8. A method of preparing bis-(2-thenal) ethylenediamine which comprises mixing 2-thiophenealdehyde and ethylenediamine in a benzene solution, refluxing the mixture and separating the water as formed, precipitating the product by addition of a nonsolvent, and separating the pure product by recrystallization.

WILLIAM S. EMERSON.
TRACY M. PATRICK, JR.

References Cited in the file of this patent

UNITED STATES PATENTS

| Number | Name | Date |
|---|---|---|
| 1,503,702 | Morton | Aug. 5, 1924 |
| 1,526,300 | Sebrell | Feb. 10, 1925 |
| 1,906,939 | Ter Horst | May 2, 1933 |
| 2,105,808 | Cramer | Jan. 18, 1938 |
| 2,149,335 | Dahlen | Mar. 7, 1939 |
| 2,281,583 | Kranzdein | May 5, 1942 |
| 2,504,903 | Sturgis | Apr. 18, 1950 |

OTHER REFERENCES

Williams, "Detoxication Mechanisms" (1947), Wiley, N. Y., pp. 194–201.

Whitmore, Organic Chemistry, pp. 884 and 893, Van Nostrand, N. Y., 1937.

Richter, Organic Chemistry, pp. 649, 650, Wiley, N. Y., 1938.

Lands, Proc. Soc. Exp. Bio. Med. 57, 55–6 (1944).

Alles, J. Pharm. Exp. Ther. 72, 265 (1941).

Powers, Advancing Fronts in Chemistry, vol. II, p. 33, Reinhold Pub. Co., N. Y., 1946.

Caesar and Sachanen, Ind. Eng. Chem. 40, 922 (1948). Ex parte Bywater 83 USPQ 4.

Steinkopf, Die Chemie des Thiophens, p. 21, Edwards Lithoprint of 1941 publication.

Mason, Chemische Berichte, 20, 268, 270 (1887).

Bernthsen and Sudborough, Organic Chemistry, p. 549, Van Nostrand, N. Y., 1922 ed.